United States Patent [19]
Cullen et al.

[11] Patent Number: 5,445,127
[45] Date of Patent: Aug. 29, 1995

[54] METHOD AND SYSTEM FOR REDUCING ENGINE SPARK KNOCK DURING A RAPID TRANSIENT

[75] Inventors: Michael J. Cullen, Dearborn, Mich.; Joseph N. Ulrey, Hiroshima, Japan; Michael R. Giangrande, Troy; Patrick J. Eggers, Fenton, both of Mich.

[73] Assignee: Ford Motor Company, Dearborn, Mich.

[21] Appl. No.: 299,135

[22] Filed: Aug. 31, 1994

[51] Int. Cl.6 .................................................. F02P 5/14
[52] U.S. Cl. .................................................. 123/422
[58] Field of Search ............... 123/422, 492, 339, 425, 123/418

[56] References Cited

U.S. PATENT DOCUMENTS

| | | | |
|---|---|---|---|
| 4,116,173 | 9/1978 | McDougal et al. | 123/117 R |
| 4,809,662 | 3/1989 | McDougal et al. | 123/425 |
| 4,915,076 | 4/1990 | Takizawa | 123/418 |
| 4,981,126 | 1/1991 | Kurihara | 123/492 |
| 4,996,959 | 3/1991 | Akimoto | 123/422 |
| 5,133,322 | 7/1992 | McDougal et al. | 123/329 |
| 5,197,431 | 3/1993 | Takaba et al. | 123/423 |
| 5,253,623 | 10/1993 | Melnyk et al. | 123/339 |
| 5,265,574 | 11/1993 | Philipp et al. | 123/422 |
| 5,345,908 | 9/1994 | Nishimura et al. | 123/339 |
| 5,355,853 | 10/1994 | Yamada et al. | 123/425 |

*Primary Examiner*—Raymond A. Nelli
*Attorney, Agent, or Firm*—Roger L. May; Peter Abolins

[57] ABSTRACT

A method and system is provided for reducing engine spark knock during rapid transient operating conditions. The method includes the step of determining, at periodic intervals, an estimate of airflow into a combustion chamber. The method also includes the step of determining, at periodic intervals, whether rapid transient operating conditions exist. If such conditions exist, an estimated spark advance is determined based on the estimated airflow. Finally, a spark is fired in the combustion chamber based on the estimated spark advance parameter.

15 Claims, 8 Drawing Sheets

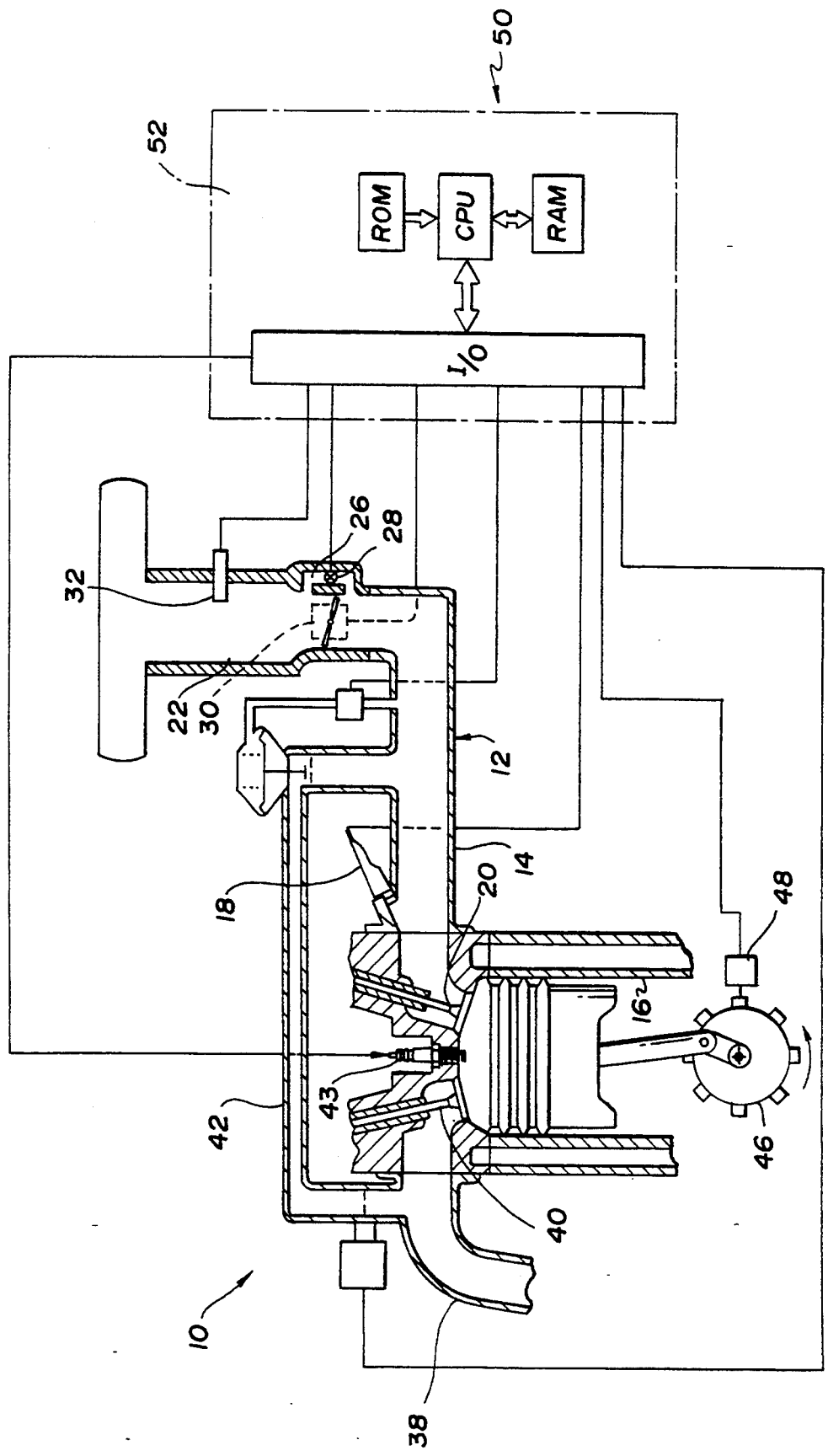

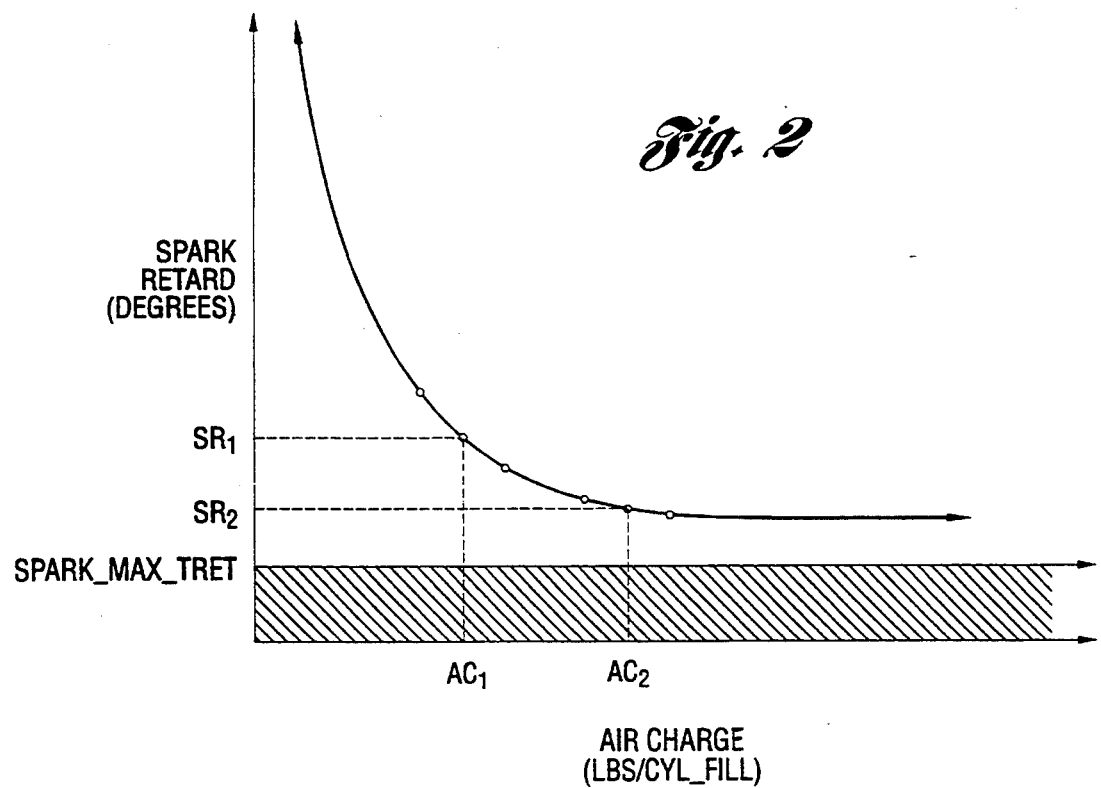
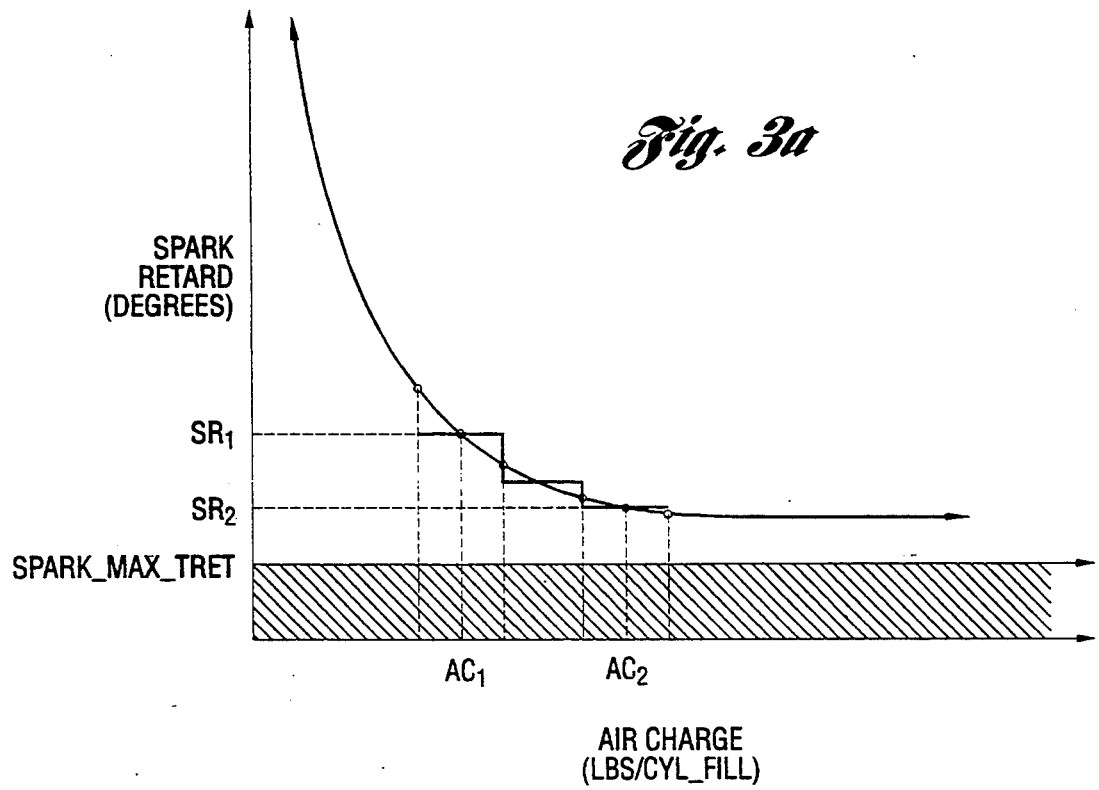

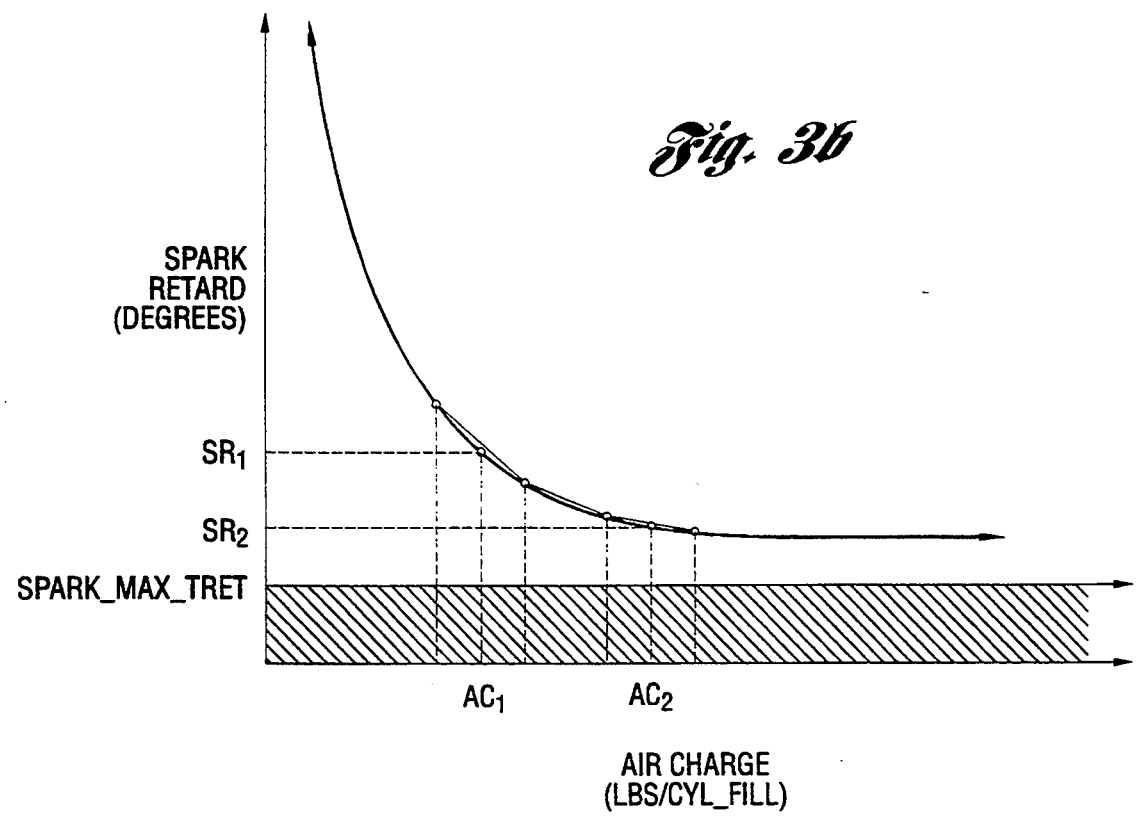
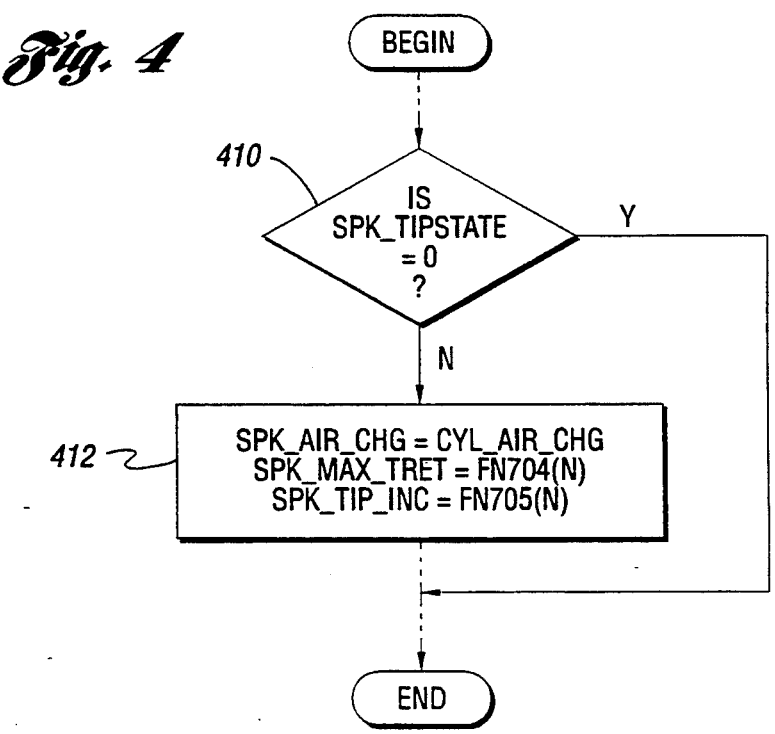

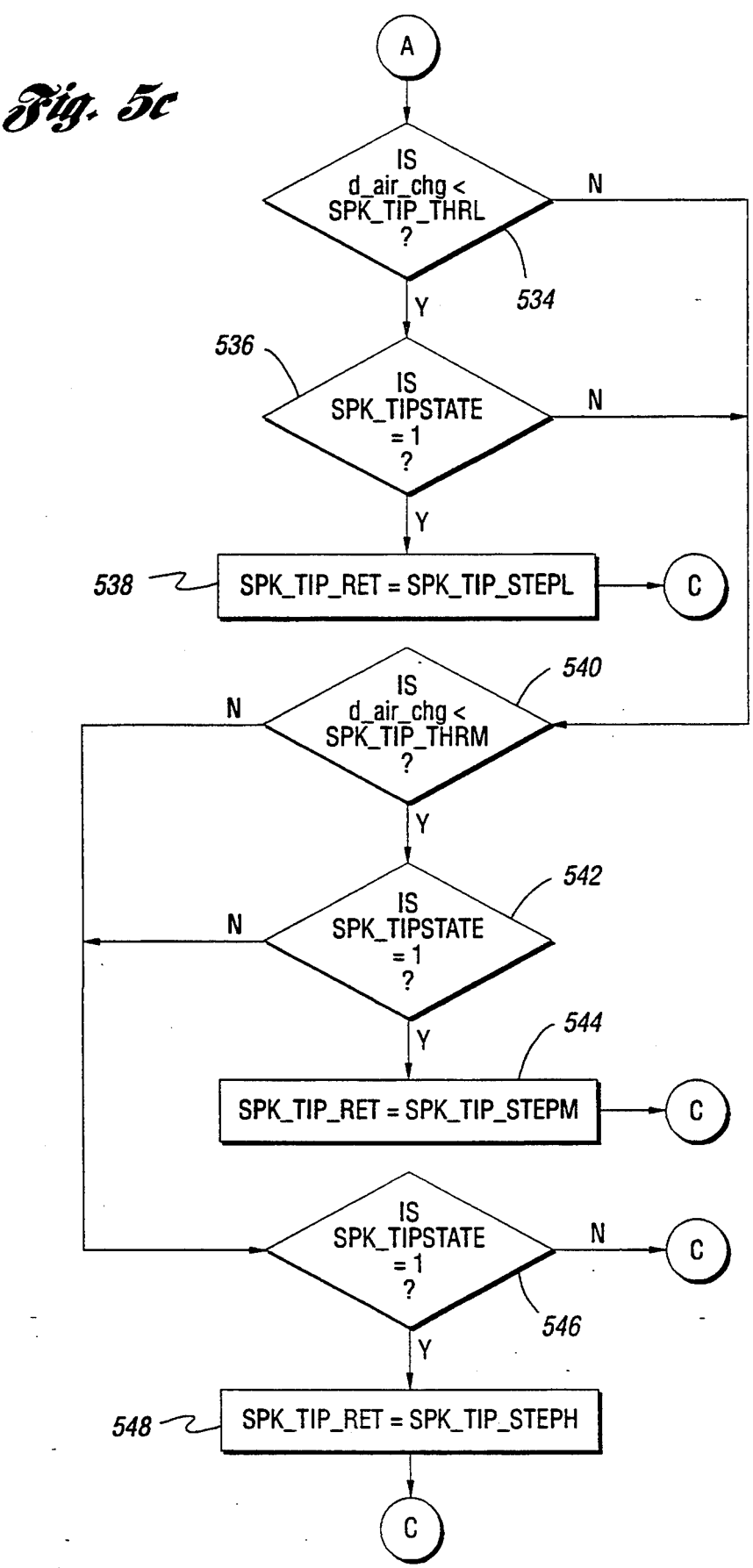

METHOD AND SYSTEM FOR REDUCING ENGINE SPARK KNOCK DURING A RAPID TRANSIENT

TECHNICAL FIELD

The present invention relates generally to methods and systems for controlling the ignition timing of an internal combustion engine. In particular, the present invention relates to methods and systems for reducing engine spark knock during rapid transient operating conditions.

BACKGROUND ART

Generally, it is desirable for an internal combustion engine to determine a spark advance parameter based on an estimate of cylinder air charge. The spark advance parameter generally represents the angle of the crankshaft at which the spark is fired in the combustion chamber. By accurately determining and using the spark advance parameter, fuel economy can be increased and engine spark knock can be avoided.

Traditional methods of determining the spark advance parameter are performed according to a control strategy executed by an electronic controller. The electronic controller, including a processor and a memory, typically utilizes outputs from a number of sensors, including a mass airflow sensor, while performing the control strategy.

The prior art teaches many methods and systems for controlling the spark timing of an internal combustion engine. For example, U.S. Pat. Nos. 4,116,173, 4,809,662 and 5,133,322 issued to McDougal et al., disclose various methods and systems for controlling the spark advance of selected cylinders of a multicylinder engine so that the spark of selected cylinders is advanced beyond others of the cylinders. One use of these inventions is to control the spark advance of the cylinders to provide differing advances for the respective cylinders to accommodate differences in operational conditions at the cylinders.

U.S. Pat. No. 5,253,623 issued to Melnyk et al., discloses a method of controlling combustion engine timing. That method provides for maintaining the speed of a spark-ignited internal combustion engine operating at a desired idle speed to compensate for engine speed variations caused by torque disturbances. The final spark advance value is determined based on a non-linear relationship between spark advance and torque ratio.

The prior art control strategies typically employ an open loop architecture with two levels of computations: a foreground loop and a background loop. The foreground loop is executed at regular intervals prior to ignition. Due to the limited time for execution, the foreground loop is typically reserved for efficient and time critical calculations. The background loop performs all other calculations related to ignition timing.

DISCLOSURE OF THE INVENTION

Under normal operating conditions, the prior art control strategies perform adequately. During a rapid change in acceleration, however, often referred to as a tip-in event or a rapid transient, engines employing the prior art methods and systems frequently experience engine knock.

A need therefore exists for a method and system for reducing engine knock of a spark-ignited internal combustion engine during rapid transient operating conditions.

It is an object of the present invention to provide a method and system for reducing the engine knock of a spark-ignited internal combustion engine during rapid transient operating conditions which provides increased fuel economy and more responsive engine control.

In carrying out the above objects and other objects of the present invention, a method is provided for eliminating engine knock of a spark-ignited internal combustion engine during rapid transient operating conditions. The engine is controlled according to a control strategy executed by an electronic controller. The electronic controller includes a processor and a memory. The method of the present invention begins with the step of determining an estimate of airflow into a combustion chamber. This determination is performed at periodic intervals. The method also includes the step of determining whether rapid transient operating conditions exist. Although there are multiple ways to accomplish this function, preferably this determination is based on a calculated airflow gradient. The method further includes the step of determining an estimated spark advance parameter based on the estimated airflow. This determination is performed after the determination that rapid transient operating conditions exist. The estimated spark advance parameter preferably represents the angle of the crankshaft at which the spark is ignited in the combustion chamber. The method finally includes the step of igniting a spark in the combustion chamber based on the estimated spark advance parameter.

In further carrying out the above objects and other objects of the present invention, a system is also provided for carrying out the steps of the above described method.

The objects, features and advantages of the present invention are readily apparent from the detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which reference characters indicate corresponding parts in all of the views, wherein:

FIG. 1 shows an engine system to which the embodiments of the present invention are applied;

FIG. 2 is a graphical illustration of a function relating desired spark advance to air charge;

FIG. 3a is a graphical illustration of a first function relating estimated spark advance to air charge;

FIG. 3b is a graphical illustration of a second function relating estimated spark advance to air charge;

FIG. 4 is a flow chart illustrating the background processing steps related to the present invention;

FIGS. 5a–5d are flow charts illustrating the foreground processing steps related to a first embodiment of the present invention;

BEST MODES FOR CARRYING OUT THE INVENTION

Figures 5A, 5B:
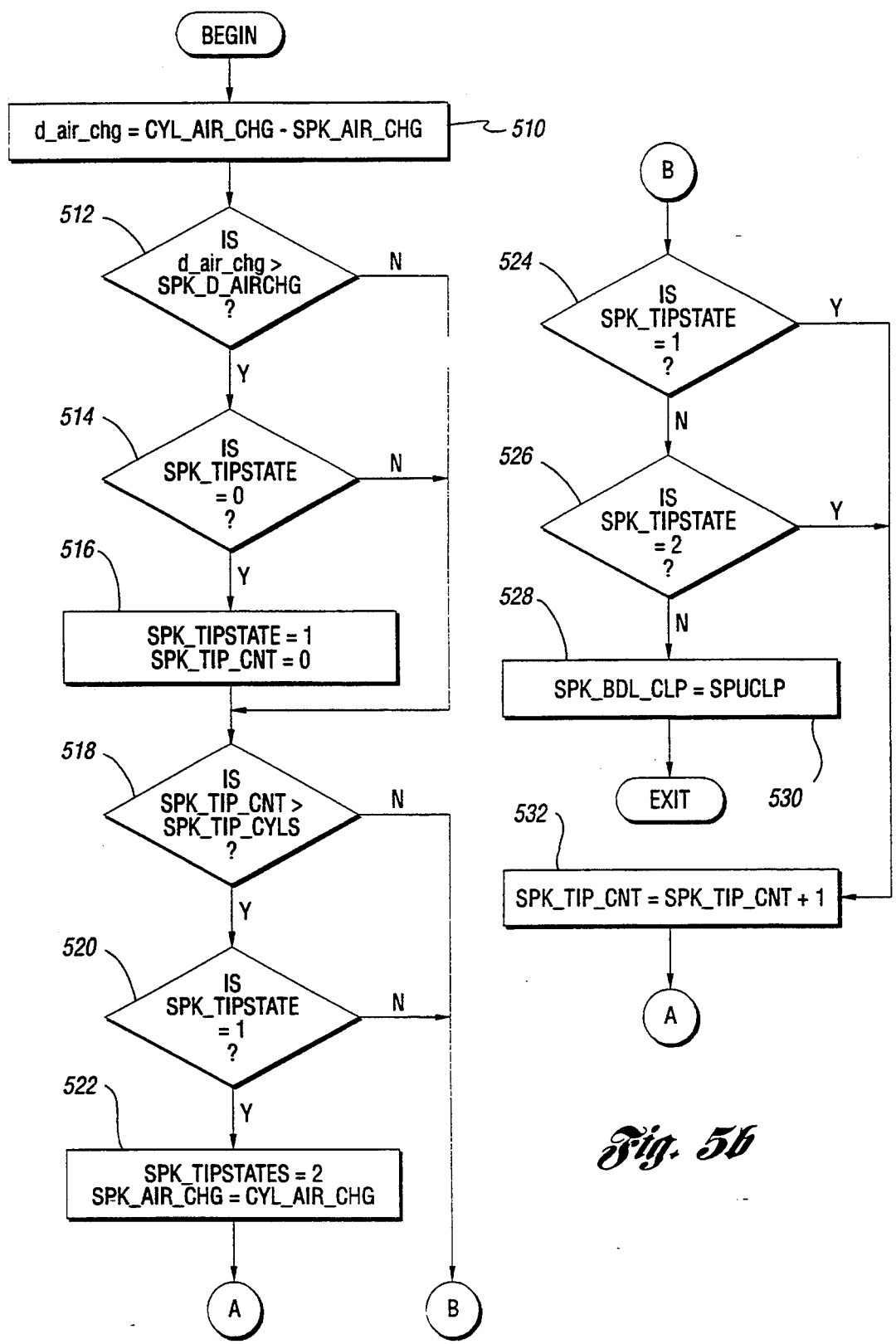

Referring now to the drawings, FIG. 1 illustrates schematically in cross-section an internal combustion engine 10 to which the embodiments of the present invention are applied. The engine 10 includes an intake manifold 12 having a plurality of runners 14 (only one of which is shown) which are individually connected to a respective plurality of combustion chambers 16 via a conventional intake port in the cylinder head as illustrated. A fuel injector 18 is coupled to each runner 14 near an intake valve 20 of each respective chamber 16. The intake manifold 12 is also connected to an throttle body 22 which includes a throttle valve 24, a bypass passage 26 which leads around the throttle valve 24 for, inter alia, idle control, and an air bypass valve 28. A position sensor 30 is operatively connected with the throttle valve 24 for sensing the angular position of the throttle valve 24. The throttle body 22 further includes a mass air-flow sensor 32, such as a hot-wire air meter.

The engine 10 further includes an exhaust manifold 38 connected to each combustion chamber 16 via a conventional exhaust port as illustrated. Exhaust gas generated during combustion in each combustion chamber 16 is released into the atmosphere through an exhaust valve 40 and the exhaust manifold 38. In communication with both the exhaust manifold 38 and the intake manifold 12 is an EGR (exhaust gas recirculation) passageway 42.

Operatively connected with the crankshaft 46 of the engine 10 is a crank angle detector 48 which detects the rotational speed (N) of the engine 10. Ignition of the air/fuel mixture within combustion chamber 16 is initiated by firing spark plug 43.

In accordance with the present invention, a spark ignition engine control system 50 is provided which is capable of determining an estimate of airflow into a combustion chamber and a spark advance parameter based on the estimated airflow. The system includes a control unit 52, which preferably comprises a microprocessor. The control unit 52 is arranged to receive inputs from the throttle valve position sensor 30, the mass airflow sensor 32 and the crank angle detector 48 via an I/O interface. The read only memory (ROM) of the microprocessor stores various operating steps representing control logic and predetermined data. By employing the stored steps, the predetermined data and the inputs described above, the control unit 52 is capable of controlling the spark timing to reduce engine knock during rapid transient operating conditions.

The basic structure of the control logic is an open-loop system employing a background loop and a foreground loop. The control logic of the background loop is responsible for monitoring the amount of air charge of the cylinders. Air charge is known in the art to represent the amount of air inducted into each cylinder during one intake stroke. The background loop is further responsible for calculating the spark advance parameter under normal operating conditions.

The processor continuously executes the steps of the background loop until receiving an interrupt. Upon receiving the interrupt, the processor begins executing the steps of the foreground loop. The interrupt is triggered at periodic intervals. Preferably, the interrupt is triggered every firing event at a predetermined crank angle. For example, once every 90 crank angle degrees in an eight cylinder engine or once every 180 crank angle degrees in a four cylinder engine.

The execution time for the foreground loop, therefore, is limited to the time between the triggering of the interrupt and the ignition of the spark. For that reason, the control logic of the foreground loop must be extremely efficient. The foreground loop should be limited to calculations which can be performed efficiently and which must be performed in close time proximity to the ignition of the spark.

Upon detection of a tip-in event, the foreground loop performs a calculation of the estimated spark advance parameter. This calculation is performed during the foreground loop to take advantage of the more recent air charge measurements. According to the present invention, the determination of air charge should also be performed by the foreground loop.

Referring now to FIG. 2, there is illustrated a desired spark curve depicting desired spark advance as a function of air charge. According to the illustrated function, given a combustion chamber air charge of $AC_1$, associated with a slightly open throttle, the desired spark advance in degrees would be $SR_1$. Likewise, an air charge of $AC_2$, associated with a mostly open throttle, relates to a desired spark advance of $SR_2$.

To illustrate the effect of a tip-in event in a prior art system, consider a rapid increase in air charge from $AC_1$ to $AC_2$.

In a prior art system, the background loop is responsible for determining estimated air charge and estimating the spark advance parameter. Prior to the tip-in event, the control logic of the background loop determines the estimated air charge to be $AC_1$. Accordingly, the spark advance parameter is determined to be $SR_1$.

The ignition control system utilizes $SR_1$ for every subsequent engine cycle until the next air charge and spark advance parameter is determined by the background loop. Many engine cycles may elapse before the spark advance parameter is recalculated.

If the air charge rapidly increases to $AC_2$ before the background loop determines a new spark advance parameter, the ignition control system will be using an outdated and inaccurate spark advance parameter. The use of inaccurate spark advance parameters by prior art systems often results in engine spark knock during rapid transient operating conditions.

Referring now to FIGS. 3a and 3b, first and second estimated spark advance functions are illustrated. Both functions are based on the desired spark function of FIG. 2.

As previously indicated, prior art systems determine air charge and spark advance parameters using the control logic of the background loop. Those functions cannot be executed during the foreground loop because they are computationally intensive and require too much processing time.

Under normal operating conditions, calculation of the spark advance parameter during the background loop produces adequate results. Under rapid transient operating conditions, however, using the spark advance parameter calculated during the background loop results in engine knock.

The method and system of the present invention provide for the foreground loop to determine the existence of rapid transient operating conditions. If it is determined that the engine is operating under rapid transient conditions, the foreground loop performs an efficient spark advance estimate to adjust the spark advance parameter.

The estimated spark advance functions of FIGS. 3a and 3b illustrate two alternative ways to efficiently estimate a spark advance parameter under rapid transient operating conditions.

In the first alternative embodiment, illustrated by FIG. 3a, the control logic of the foreground loop determines the air charge within the combustion chamber. The control logic then determines an estimated spark advance value based on ranges of air charges.

It is envisioned that the determination of the estimated spark advance value may be hard coded into the control logic or may be based on a table of values stored in ROM. The table of values relate ranges of air charges to estimated spark advance parameter values.

In the second alternative embodiment, illustrated by FIG. 3b, the control logic of the foreground loop determines the air charge within the combustion chamber. The control logic then determines an estimated spark advance value based on the spark advance parameter calculated by the background loop and an offset based on a slope.

It is envisioned that the determination of the estimated spark advance value may be hard coded into the control logic or may be based on a table of values stored in ROM. The table of values relate ranges of air charges to values representing slopes.

Figure 5B:
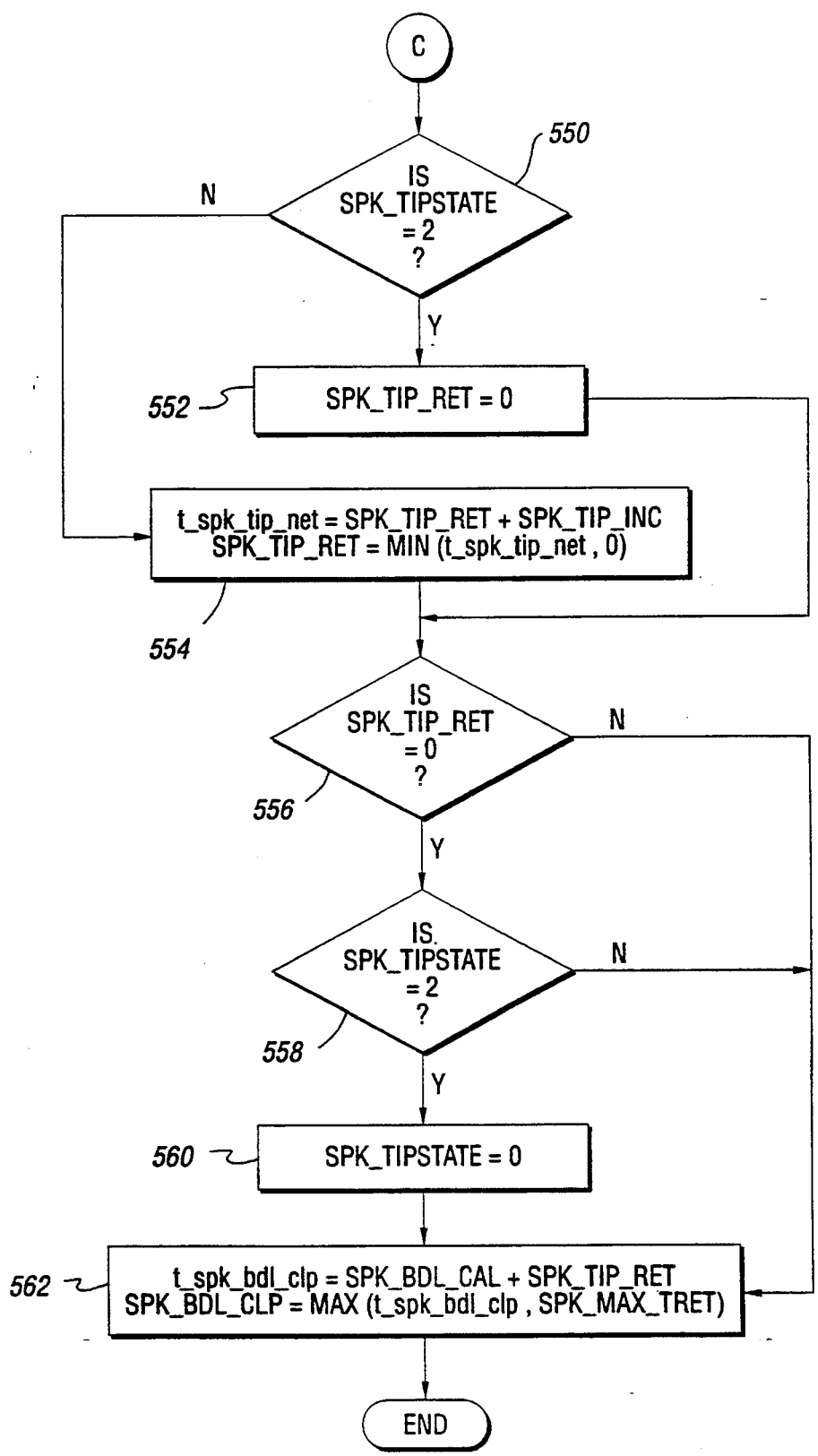
Figure 6:
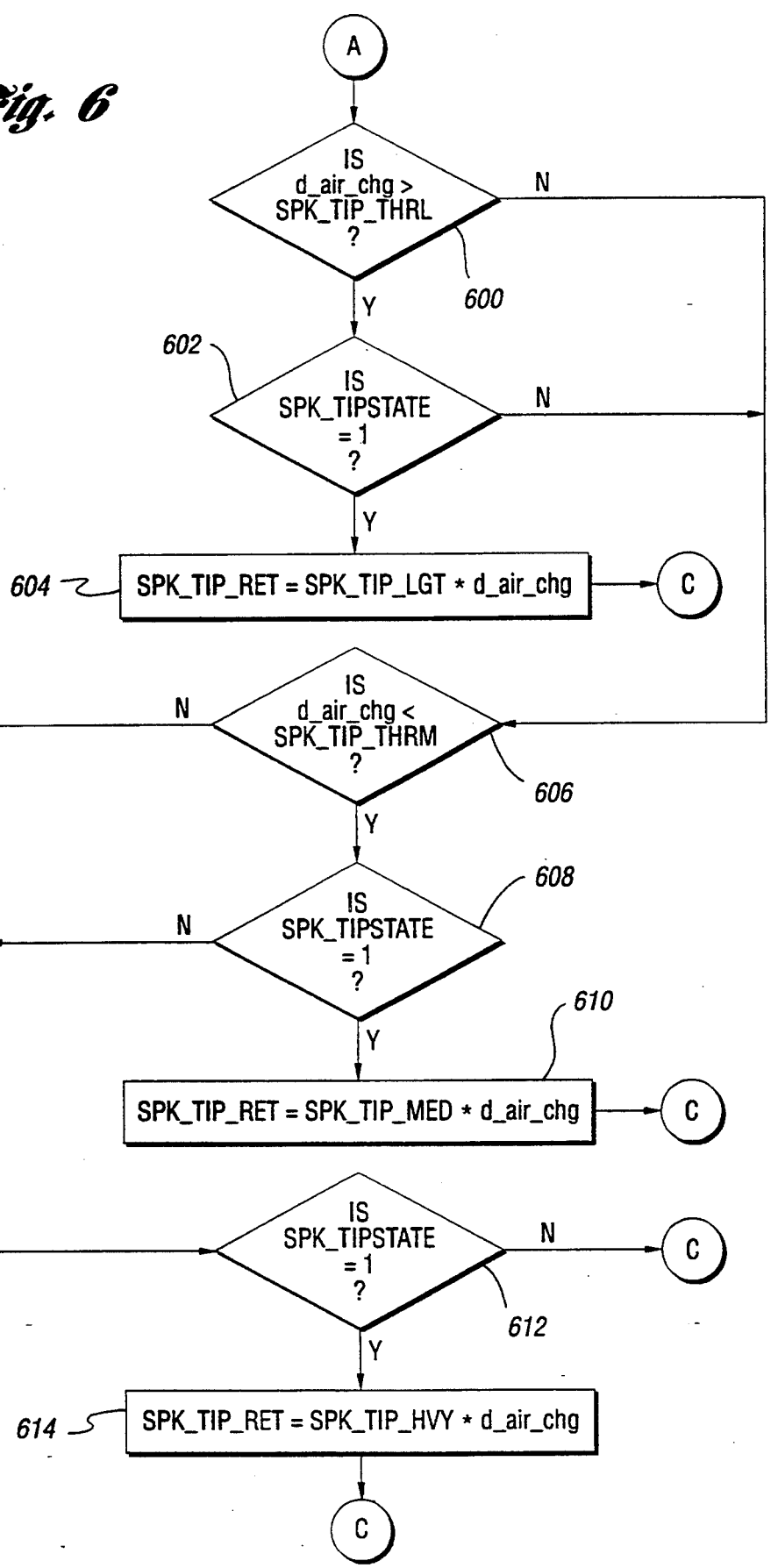
FIG. 6 is a flow chart illustrating the foreground processing steps related to a second embodiment of the present invention.

Referring now to FIGS. 4–6, the following is a glossary of abbreviations for terms utilized throughout the remainder of this disclosure:

Variables

CYL_AIR_CHG = Current cylinder air charge
d_air_chg = Difference in air charge between background calculation and foreground calculation
N = Engine speed RPM
SPK_AIR_CHG = Cylinder air charge used to calculate load for use in spark calculations
SPK_BDL = Borderline detonation limit of spark at steady state (known in the art)
SPK_BDL_CLP = Borderline detonation spark limit modified for change in cylinder air charge from when borderline detonation limit (SPK_BDL) was computed
SPK_D_AIRCHG = Minimum difference in cylinder air charge to allow a tip-in advance event (larger than steady state pulsations)
SPK_TIP_CNT = Number of cylinder events since tip-in event began
SPK_TIP_RET = Spark advance for tip-in event
SPK_TIPSTATE = State transition variable for air-charge based tip-in knock control, (0 = use background calculation; 1 = use foreground for SPK_TIP_CYLS number of events; 2 = blend back to background calculation)
FN704 = A predetermined maximum spark advance during air-charge based tip-in knock control versus N
FN705 = A predetermined Spark advance to add in for each cylinder event after a tip-in advance versus N
SPUCLP = Upper limit spark clip for rotor registry.

Constants

SPK_MAX_TRET = Maximum spark advance during air-charge based tip-in knock control SPK_TIP_CYLS = Number of cylinder events to hold, spark advanced during a tip-in advance event
SPK_TIP_HVY = Amount of spark advance (per unit of air charge) to use for a heavy tip-in event
SPK_TIP_INC = Spark advance to add in for each cylinder event after a tip-in advance
SPK_TIP_LGT = Amount of spark advance (per unit of air charge) to use for a light tip-in event
SPK_TIP_MED = Amount of spark advance (per unit of air charge) to use for a medium tip-in event
SPK_TIP_THRL = Difference in cylinder air charge to trigger a light tip-in event
SPK_TIP_THRM = Difference in cylinder air charge to trigger a medium tip-in event FIG. 4 illustrates the processing steps of the background loop related to the present invention. At step 410, the value of the variable SPK_TIPSTATE is tested. SPK_TIPSTATE indicates the current engine operating condition. If engine is operating under normal conditions, (i.e. SPK_TIPSTATE = 0) the standard background calculation of the spark advance parameter SPK_BDL_CLP is used.

If, on the other hand, the engine is operating under rapid transient conditions (i.e. SPK_TIPSTATE = 1) or the engine is operating under post rapid transient operating conditions (i.e. SPK_TIPSTATE = 2), certain variables are assigned to utilize information from the foreground processing loop.

Specifically, at step 412, the variable representing air charge, SPK_AIR_CHG, is updated based on a more recent air charge determination (CYL_AIR_CHG) made during the foreground processing loop. Further, SPK_MAX_TRET and SPK_TIP_INC are defined as functions of engine speed (N).

FIGS. 5a–5d illustrate the foreground processing steps related to a first embodiment of the present invention. Typically, the foreground loop is executed once per engine cylinder event.

Referring now to FIG. 5a, as shown at step 510, the change in cylinder air charge between the background and foreground (i.e. d_air_chg) is calculated. Next, as shown at steps 512 and 514, using the change in cylinder air charge, a determination is made whether the engine is operating under rapid transient conditions and whether this is a newly identified tip-in. If these conditions are satisfied, control variables SPK_TIPSTATE and SPK_TIP_CNT are initialized as shown at step 516.

Spark advance under rapid transient operating conditions should occur for a number of cylinder events to ensure that the engine stabilizes enough for traditional knock control. At steps 518 and 520, the foreground control logic determines if the engine has stabilized and if the tip-in flag SPK_TIPSTATE indicates a rapid transient operating condition.

If both conditions are satisfied, the tip-in flag SPK_TIPSTATE is updated to indicate a post rapid transient operating condition. Further, as shown at block 522, the air charge variable calculated by the background loop is updated to equal the air charge variable calculated by the foreground loop. This prevents a new rapid transient condition to be erroneously detected.

The control logic illustrated by FIG. 5b is executed if either of conditions 518 or 520 are not satisfied. As shown at block 524, the tip-in state variable (SPK_TIPSTATE) is tested for rapid transient condition. If a rapid transient operating condition is indicated, the variable representing the number of cylinder events since tip-in event began, SPK_TIP_CNT, is updated, as shown by block 532 and processing continues.

If, as shown at block 526, the tip-in state variable (SPK_TIPSTATE) indicates post rapid transient operating conditions, processing also continues. If neither of blocks 524 or 526 are satisfied, the spark advance variable is set to an upper limit spark clip and the processor returns control from the foreground loop.

Referring now to FIG. 5c, the control logic for estimating the spark advance according to the first alternative embodiment is illustrated. At blocks 534 and 536, the control logic checks whether a light tip-in event has occurred and whether the tip-in flag indicates rapid transient operating conditions. If both conditions are satisfied, the spark advance estimate is determined, as shown by block 538, according to a step function.

At blocks 540 and 542, the control logic checks whether a medium tip-in event has occurred and whether the tip-in flag indicates rapid transient operating conditions. If both conditions are satisfied, the spark advance estimate is determined, as shown by block 544, according to a step function.

At block 546, a heavy tip-in event is assumed. The tip-in flag is tested to determine if it indicates rapid transient operating conditions. If so, the spark advance estimate is determined, as shown by block 548, according to a step function.

Referring now to FIG. 5d, the tip-in flag is tested, as shown at block 550, to determine if post rapid transient conditions exist. If they do not exist, the spark advance offset is set to zero at block 552. If post rapid transient conditions do exist, block 554 is processed. The spark advance offset is stepped down incrementally to a minimum of zero.

As shown at blocks 556 through 560, if the spark advance offset is zero and the engine is operating under post-rapid transient operating conditions, the tip-in flag is reset. Foreground loop processing is complete with block 562 which calculates the clipped borderline spark advance parameter SPK_BDL_CLP.

Referring now to FIG. 6, the control logic for estimating the spark advance according to the second alternative embodiment is illustrated. The steps of FIG. 6 replace the steps of FIG. 5c to implement the second alternative embodiment.

At blocks 600 and 602, the control logic checks whether a light tip-in event has occurred and whether the tip-in flag indicates rapid transient operating conditions. If both conditions are satisfied, the spark advance estimate is determined, as shown by block 604, based on a first slope.

At blocks 606 and 608, the control logic checks whether a medium tip-in event has occurred and whether the tip-in flag indicates rapid transient operating conditions. If both conditions are satisfied, the spark advance estimate is determined, as shown by block 610, according to a second slope.

At block 612, a heavy tip-in event is assumed. The tip-in flag is tested to determine if it indicates rapid transient operating conditions. If so, the spark advance estimate is determined, as shown by block 614, according to a third slope.

Figure 7:
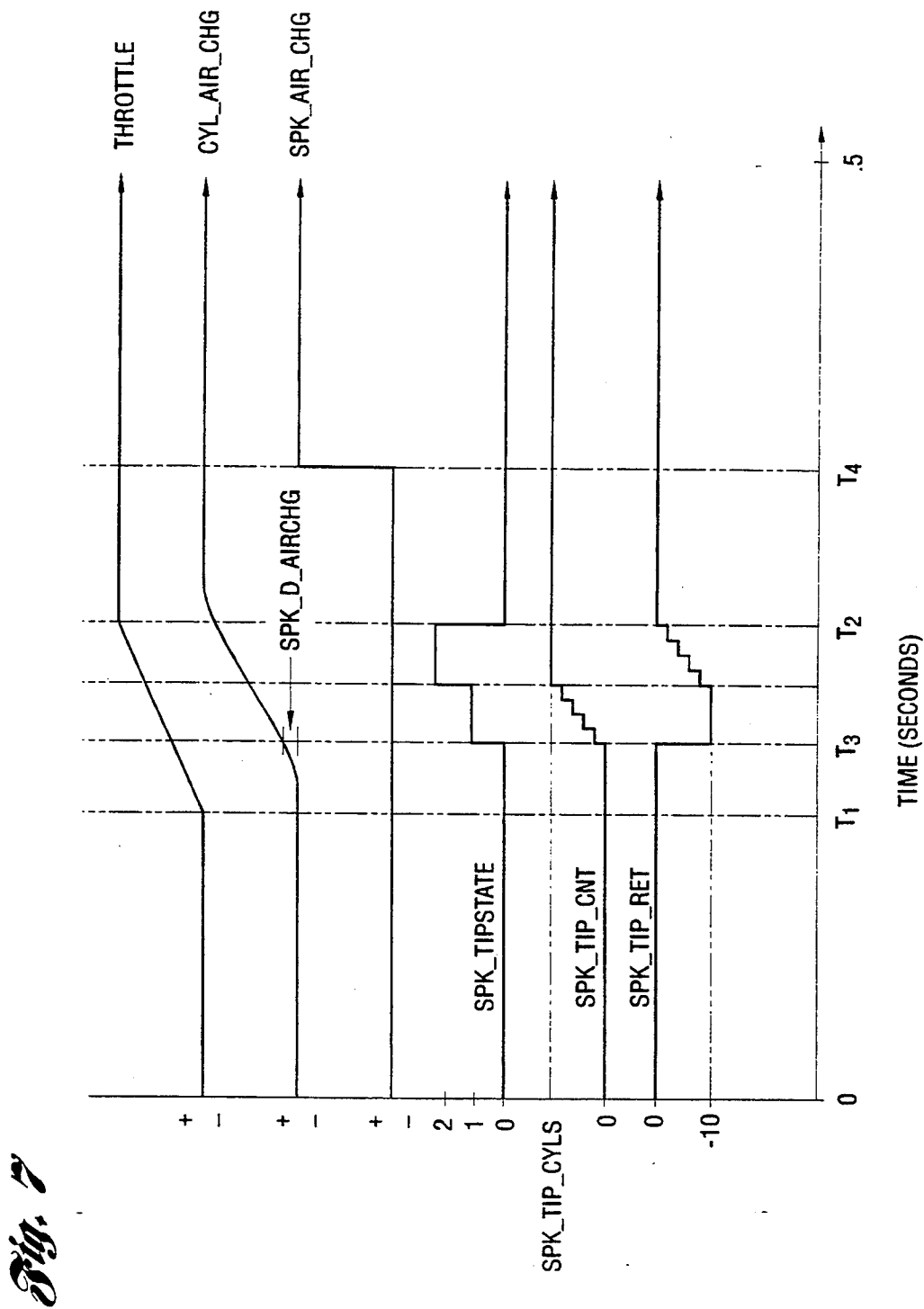
FIG. 7 is a graphical illustration of system events as a function of time.

FIG. 7 is a graphical illustration of system events as a function of time. The graph illustrates events over 0.5 seconds. As shown by the graph of throttle activity, the tip-in event occurs between time $T_1$ and $T_2$.

As shown by the graph of CYL_AIR_CHG, at time $T_3$, the foreground processing loop detects the tip in event. The tip-in event is detected based on a difference between CYL_AIR_CHG, the air charge calculated by the foreground processing loop, and SPK_AIR_CHG, the air charge calculated by the background processing loop. During the rapid transient and post-rapid transient operating conditions, the value of SPK_AIR_CHG remains unchanged.

Upon detecting the tip-in event, the foreground control logic sets the tip-in flag to 1. This indicates the rapid transient operating condition. Processing continues in this state for a predetermined number of engine cycles. The number of engine cycles is tracked by SPK_TIP_CNT. Upon reaching the predetermined number of engine cycles, SPK_TIPSTATE is updated to reflect post-rapid transient processing.

Post-rapid transient processing is intended to allow a smooth transition from rapid transient engine operation back to normal engine operation. As shown by the graph of SPK_TIP_RET, the tip-in spark advance offset, the spark advance is incrementally stepped back to that of a normal operating mode. Once the engine operation is stabilized, the foreground control logic updates the tip-in flag SPK_TIPSTATE to reflect the return to normal operating conditions.

While the best mode for carrying out the invention has been described in detail, those familiar with the art to which this invention relates will recognize various alternative designs and embodiments for practicing the invention as defined by the following claims.

What is claimed is:

1. A method for reducing engine knock of a spark-ignited internal combustion engine during rapid transient operating conditions, the engine being controlled according to a control strategy executed by an electronic controller having a processor and a memory, the method comprising:
   determining, at periodic intervals, an estimate of airflow into a combustion chamber;
   determining, at periodic intervals, whether rapid transient operating conditions exist;
   upon determining that rapid transient operating conditions exist, calculating an estimated spark advance parameter based on the estimated airflow; and
   forming a spark in the combustion chamber based on the estimated spark advance parameter.

2. The method of claim 1 wherein the periodic intervals are based on an output of a crank angle sensor.

3. The method of claim 1 including the step of receiving an interrupt indicating the beginning of a periodic interval.

4. The method of claim 1 wherein the step of determining an estimated spark advance parameter includes:
   identifying a range from a plurality of ranges of air charge values based on the estimated airflow; and
   determining the estimated spark advance parameter based on a spark advance value associated with the identified range.

5. The method of claim 1 wherein the step of determining an estimated spark advance parameter includes:
   identifying a range from a plurality of ranges of air charge values; and
   determining the estimated spark advance parameter based on a slope value associated with the identified range based on the estimated airflow, 6. The method of claim 1 further including the step of:
   utilizing the estimated spark advance parameter for a plurality of engine cycles.

7. The method of claim 6 further including the steps of:
   determining that the plurality of engine cycles have occurred;
   determining a reduced spark advance parameter by reducing the estimated spark advance parameter a predetermined amount each engine cycle following the plurality of engine cycles; and
   utilizing the reduced spark advance parameter each engine cycle following the plurality of engine cycles until the reduced spark parameter equals zero.

8. A system for reducing engine knock of a spark-ignited internal combustion engine during rapid transient operating conditions, the engine being controlled according to a control strategy executed by an electronic controller having a processor and a memory, the system comprising:
   means for determining, at periodic intervals, an estimate of airflow into a combustion chamber;
   means for determining, at periodic intervals, whether rapid transient operating conditions exist;
   means for determining an estimated spark advance parameter based on the estimated airflow; and
   means for igniting a spark in the combustion chamber based on the estimated spark advance parameter.

9. The system of claim 8 wherein the periodic intervals are based on an output of a crank angle sensor.

10. The system of claim 8 including means for receiving an interrupt indicating the beginning of a periodic interval.

11. The system of claim 8 wherein the means for determining an estimated spark advance parameter includes:
    means for identifying a range from a plurality of ranges of air charge values based on the estimated airflow; and
    means for determining the estimated spark advance parameter based on a spark advance value associated with the identified range.

12. The system of claim 1 wherein the means for determining an estimated spark advance parameter includes:
    means for identifying a range from a plurality of ranges of air charge values; and
    means for determining the estimated spark advance parameter based on a slope value associated with the identified range based on the estimated airflow.

13. The system of claim 1 further including:
    means for utilizing the estimated spark advance parameter for a plurality of engine cycles.

14. The system of claim 13 further including:
    means for determining that the plurality of engine cycles have occurred;
    means for determining a reduced spark advance parameter by reducing the estimated spark advance parameter a predetermined amount each engine cycle following the plurality of engine cycles; and
    means for utilizing the reduced spark advance parameter each engine cycle following the plurality of engine cycles until the reduced spark parameter equals zero.

15. A method for reducing engine knock of a spark-ignited internal combustion engine during rapid transient operating conditions, the engine being controlled according to a control strategy executed by an electronic controller having a processor and a memory, the method comprising:
    determining a first estimate of airflow into a combustion chamber in a background processing routine;
    determining, at periodic intervals in a foreground processing routine, a second estimate of airflow into the combustion chamber;
    calculating a difference between the first estimate of air flow and the second estimate of air flow;
    calculating an estimated spark advance parameter based on the difference; and
    forming a spark in the combustion chamber based on the estimated spark advance parameter.

* * * * *